US011512589B2

(12) United States Patent
Russell et al.

(10) Patent No.: US 11,512,589 B2
(45) Date of Patent: Nov. 29, 2022

(54) DOWNHOLE STRAIN SENSOR

(71) Applicant: The Board of Regents of The University of Texas System, Austin, TX (US)

(72) Inventors: Rodney Thompson Russell, Austin, TX (US); Mukul Sharma, Austin, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 0 days.

(21) Appl. No.: 17/059,529

(22) PCT Filed: Jun. 3, 2019

(86) PCT No.: PCT/US2019/035178
§ 371 (c)(1),
(2) Date: Nov. 30, 2020

(87) PCT Pub. No.: WO2019/232521
PCT Pub. Date: Dec. 5, 2019

(65) Prior Publication Data
US 2021/0301656 A1  Sep. 30, 2021

Related U.S. Application Data

(60) Provisional application No. 62/679,219, filed on Jun. 1, 2018.

(51) Int. Cl.
*E21B 49/00* (2006.01)
*G01L 1/02* (2006.01)

(52) U.S. Cl.
CPC .......... *E21B 49/006* (2013.01); *G01L 1/02* (2013.01)

(58) Field of Classification Search
CPC ..... E21B 49/006; E21B 17/1057; E21B 47/01
See application file for complete search history.

(56) References Cited

U.S. PATENT DOCUMENTS

8,584,519 B2 * 11/2013 Maida .................... E21B 47/16
73/152.54
8,800,653 B2 * 8/2014 Dria ...................... E21B 47/007
166/253.1
9,222,828 B2 * 12/2015 Fripp .................... E21B 47/005
(Continued)

*Primary Examiner* — Shane Bomar
(74) *Attorney, Agent, or Firm* — Kowert, Hood, Munyon, Rankin & Goetzel, P.C.; Gareth M. Sampson (57) ABSTRACT

A device for measuring strain on the exterior of a pipe includes a body comprising a top portion and a bottom portion; one or more elastically deformable members coupled between the top portion and the bottom portion, wherein each of the one or more elastically deformable members have an outer contact surface and an inner non-contact surface. One or more sensors are disposed on the inner non-contact surface of one or more of the elastically deformable members. The sensors, during use, provide data that can be used to determine changes in strain on the exterior of the pipe. In another embodiment, one or more sensors are embedded in, or attached to, a casing disposed in a wellbore. In an embodiment, a method includes pressurizing or depressurizing the wellbore with a fluid and measuring the strain induced in the casing (or in an open wellbore) in response to this change in wellbore pressure.

16 Claims, 5 Drawing Sheets

(56) References Cited

U.S. PATENT DOCUMENTS

| | | | | |
|---|---|---|---|---|
| 2005/0109097 A1* | 5/2005 | Bogath | ............... | E21B 47/007 |
| | | | | 73/152.49 |
| 2006/0115335 A1* | 6/2006 | Allen | ............... | E21B 47/01 |
| | | | | 405/274 |
| 2007/0143027 A1* | 6/2007 | Nutt | ............... | G01V 1/40 |
| | | | | 702/14 |
| 2008/0181555 A1* | 7/2008 | Head | ............... | E21B 47/09 |
| | | | | 385/13 |
| 2010/0300685 A1* | 12/2010 | Del Campo | ............... | E21B 47/135 |
| | | | | 166/254.2 |
| 2011/0185807 A1* | 8/2011 | Albrecht | ............... | E21B 47/01 |
| | | | | 73/152.57 |
| 2012/0230151 A1* | 9/2012 | Almaguer | ............... | E21B 43/11 |
| | | | | 166/241.1 |
| 2017/0284188 A1* | 10/2017 | Igarashi | ............... | E21B 47/092 |
| 2018/0003029 A1* | 1/2018 | Roberson | ............... | E21B 33/14 |
| 2018/0252100 A1* | 9/2018 | Ranjan | ............... | E21B 33/14 |
| 2019/0064387 A1* | 2/2019 | Ohanian, III | ............... | E21B 47/135 |

* cited by examiner

DOWNHOLE STRAIN SENSOR

BACKGROUND OF THE INVENTION

1. Field of the Invention

The invention generally relates to measuring stresses, strains and changes in stress and strain in a subterranean wellbore.

2. Description of the Relevant Art

There are a variety of methods currently used for estimating the orientation and magnitude of the in-situ stress and changes in the stress around the wellbore. Current methods include, but are not limited to: (i) imaging borehole breakouts; (ii) shear wave anisotropy; (iii) downhole or surface tiltmeters; (iv) inelastic strain relaxation; (v) imaging natural and drilling induced fractures; (vi) downhole or surface microseismic measurements. Most of these methods have some key shortcomings, limitations, and challenges:
1. Most of these methods do not have the ability to continuously measure and monitor changes in the in-situ stress over a period of time.
2. Most of these methods are unable to monitor changes in the stress or stain field during a fracturing operation in a nearby well.
3. None of the methods is able to accurately quantify the magnitude and orientation of the maximum and minimum horizontal stress.
4. Most of these methods are very expensive to use and, therefore, not commonly applied.
5. Many methods require specialized tools, procedures or models to use and interpret.

Some downhole strain sensors used in wells are composed of long fiber optic cables, strapped to or wound around the outside of the casing. Moreover, in order to protect the fiber optic cable the strain sensor is actually embedded in several layers of insulating materials (typically a steel tube filled with a gel). Accurately measuring strain through multiple layers of material is very difficult to achieve and the resulting uncertainty is problematic.

PCT Publication No. WO 96/231216 entitled "Borehole Strainmeter" discusses a generally longitudinal strain measurement device that measures change in length and are only suitable for vertical pipes. The devices described in WO 96/231216 are single point devices that appear to be both extremely delicate and sensitive.

It is desirable to have a device for measuring strain that measures the radial strain in a wellbore casing at different orientations or azimuths at different locations in a well. This sensor array is much more robust and is designed to be used in a linear array of either horizontal or vertical pipes.

SUMMARY OF THE INVENTION

In an embodiment, a device for measuring the axial or radial strain of a pipe includes: one or more elastically deformable members with different radial orientations in a wellbore, wherein each of the one or more elastically deformable members comprise an outer contact surface and an inner non-contact surface; and one or more sensors disposed on the inner non-contact surface of one or more of the elastically deformable members. The sensors, during use, provide data that can be used to determine changes in radial strain in the pipe at different azimuthal orientations. As used herein, an azimuthal orientation refers to a projected vector extending from an origin (typically a point at the center of the wellbore or pipe) to a point that is projected perpendicularly onto the surface of the pipe or wellbore. The angle between the projected vector and a reference vector on the reference plane is called the azimuth.

In an embodiment, a method of measuring strain in the pipe positioned in a wellbore includes positioning a device or a system, as described above, inside the pipe such that the elastically deformable members of the device contact the interior surface of the pipe.

In an embodiment, a method of measuring strain in an open hole of a wellbore includes positioning a device or a system, as described above, inside the open hole such that the elastically deformable members of the device contact the sidewalls of the open hole.

In an embodiment, a method of measuring strain in a cased wellbore includes positioning a device or a system, as described above, inside the open hole such that the elastically deformable members of the device contact the sidewalls of the open hole.

In an embodiment, a method includes measuring axial or radial strain at different azimuthal orientations in an open-hole wellbore or a cased and cemented wellbore.

In an embodiment, a method includes measuring the axial or radial strain at different azimuthal orientations in an open hole wellbore or a metal cased and cemented wellbore as a portion of the wellbore is pressurized with fluid.

In an embodiment, a method includes measuring axial or radial strain at different azimuthal orientations in an open-hole wellbore or a metal cased, cemented wellbore as the rock around the wellbore is hydraulically fractured from the same wellbore or from another wellbore.

In an embodiment, a method includes pressurizing or depressurizing the wellbore with any fluid and measuring the strain induced in the casing (or in an open wellbore) in response to this change in wellbore pressure.

BRIEF DESCRIPTION OF THE DRAWINGS

Advantages of the present invention will become apparent to those skilled in the art with the benefit of the following detailed description of embodiments and upon reference to the accompanying drawings in which.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary.

It is also to be understood that the terminology used herein is for the purpose of describing particular embodiments only and is not intended to be limiting. As used in this specification and the appended claims, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The present invention, in one embodiment, relates to the measurement of strain in a wellbore. Measurement of strain in a wellbore can be used, for example, to diagnose the geometry of hydraulic fractures in the subsurface. Various models predict that during hydraulic fracturing of a neighboring well, strains on the order of $10^{-5}$ to $10^{-6}$ will propagate ahead of the fractures and could be used to determine the geometry of the fracture.

In another embodiment, the method presents a non-intrusive and inexpensive method to measure the orientation and magnitude of in-situ stresses at different depths (stress profiles) in subsurface formations. The strain measurements can be used to measure changes in the borehole shape as the wellbore is pressurized with fluids (using a retrievable packer below the tool). The change in borehole shape with wellbore pressure is directly related to the magnitude and orientation of the in-situ stress field. Changes in the strain in different orientations and/or positions in the wellbore, as the wellbore is pressurized, can be directly related to the in-situ stress field.

Several strain measuring devices can be run on a single tool string to measure the magnitude and orientation of the different components of the stress field at different depths to obtain a vertical stress profile non-intrusively (without having to conduct a mini-fracture or DFIT) in the formations of interest.

In another embodiment the tool can be used for long term monitoring of seismic sites by monitoring the local stress/strain fields around volcanoes and fault lines.

Ambient mechanical pressure surrounding a cased wellbore pushes from the formation (e.g., shale) against the cement surrounding the pipe (e.g., the casing) and through to the pipe. The pressure from the formation is sufficient enough to inhibit slipping between the interfaces. Therefore, the inside of the pipe will be strain matched to the surrounding formation. A pipe (e.g., a casing) disposed in a wellbore has a nominally circular cross-section, but the external force from the formation will deform this cross-section elliptically. The extent of the deformation may be directly related to the pressure from the formation and in the wellbore.

In one embodiment, a device for measuring strain exerted on the exterior of a pipe from a formation is composed of one or more elastically deformable members laid out in a radial array at different radial (azimuthal) orientations in the wellbore. Each of the one or more elastically deformable members comprises an outer contact surface and an inner non-contact surface. The outer contact surfaces of the one or more elastically deformable members, in this embodiment, are in contact with the interior surface of the pipe in a cased wellbore) or in contact with the wellbore wall (in an openhole wellbore). One or more sensors are disposed on the inner non-contact surface of the one or more elastically deformable members. During use, the sensors provide data that can be used to determine the strain or changes in strain in the pipe.

In one embodiment, the sensors disposed on the elastically deformable members are strain sensors that determine changes in strain on the elastically deformable members. This change in strain on the elastically deformable members can be related to the change in strain on the exterior of the pipe. When forces on the exterior of the pipe change (either by increasing or decreasing) the cross-sectional shape of the pipe also changes. Changes to the cross-sectional shape of the pipe will alter the strain on the elastically deformable members. This allows any changes in the strain on the elastically deformable members to be related to changes in strain on the exterior of the pipe by the formation.

Strain is herein defined as the deformation per unit of length of a material when force is applied to it. Strain can be calculated as a ratio of a material's change in length from an initial unstressed reference length. Strain sensors, as used herein, are devices that sense changes in the length of a material and convert the changes into an electrical signal. In the current embodiment, changes in the length of the elastically deformable members, due to changes in the cross-section of the pipe, are captured by the strain sensors.

A variety of strain sensors are known in the art, and any suitable strain sensor may be coupled to one or more of the elastically deformable members. Commercially available strain sensors include metallic wire-type strain gauges, semiconductor strain gauges (e.g., piezoelectric strain gauges), nanoparticle based strain gauges, optical fiber strain gauges, capacitive strain gauges, and vibrating wire strain gauges.

The sensors may be powered using a power supply that is integrated with the sensor. Alternatively, a thermoelectric generator may be used to power one or more of the sensors.

In one embodiment, a multi-arm caliper sensor may be used to monitor the strain of the elastically deformable members at different radial orientations in the wellbore. A specific example of a multi-arm caliper sensor comprises a radial array of thin flexible arms, each arm having a strain gauge mounted to the arm. Alternatively, a tilt sensor may be used to monitor changes in the deflection angle of the elastically deformable members.

The elastically deformable members may be formed from carbon fiber rods. The rods are slightly longer than the distance between the top and bottom portions and bow out to form shallow curves. When the springs move, due to changes in strain, their longitudinal displacement changes the bend in the curve. The curve's vertex moves transversely at a faster rate thereby geometrically magnifying the motion.

External forces on a pipe in a wellbore can cause axial strain, as well as cross-sectional strain. Axial strain may be indicated by lengthening or shortening of the pipe. The devices described herein may be used to monitor axial or radial stain in a pipe. In one embodiment, two or more devices having one or more elastically deformable members are coupled to each other. The devices each include one or more sensors coupled to the elastically deformable members. The sensors may be position sensors, strain sensors, or a combination of both position and strain sensors. When position sensors are used, the position sensors monitor the position between the devices. In one example, two devices are coupled together by an elongated connector. The position sensors may monitor the distance between the two devices. When positioned in the pipe the devices are held in position by the elastically deformable members and the distance between the devices is initially determined. As forces on the pipe in the vicinity of the coupled devices change, the pipe may be lengthened or shorted. The devices may be, therefore, pulled away from each other (indicated by an increase in the determined distance between the device position sensors) or pushed toward each other (indicated by a decrease in the determined distance between the device position sensors). The change in distance may be used to determine the change in forces applied to the pipe. Cable potentiometers can be used to measure the distance between the devices.

The distance between devices will magnify local strains into accumulated extension that can be detected using position monitoring sensors. For example, assuming $10^{-5}$ strain distributed over 10 meters. The axial extension of the pipe is on the order of 0.1 mm. In one embodiment, a distance sensor may be placed in the pipe and coupled to a device position sensor. When the device is coupled to the pipe through the elastically deformable members, any movement of the device, with respect to the pipe mounted sensor can be attributed to axial lengthening or shortening of the pipe. In another embodiment the strain may be radial and the change in diameter of the pipe in different orientations may be similarly monitored with time.

Commercially available position sensors can measure changes in position on the order of 1 µm~10 µm. Position sensors include a Linear Variable Differential Transformer (LVDT), fiber-optic proximity sensors, eddy-current sensors, air gauging-based sensors, Hall effect sensors, ultrasonic sensors, photonic sensors, capacitive sensors, and laser-based sensors In one embodiment, centralizer bow-spring assemblies already used in oil-well tools may be modified by adding one or more sensors to the bow-shaped springs. During normal usage, these centralizer spring units deform to position downhole oil-well tools in the center of the casing and provide clearance as the downhole tools transition across joints and bends during insertion and removal. By mounting the sensors in specific locations on the bow-spring assembly it is possible to monitor changes in the strain induced in the casing that is in contact with the centralizer spring assembly at different radial orientations. Strains that measure an elliptical shaped borehole indicates unequal stresses being exerted on the pipe in different directions. Ambient mechanical pressure at depth pushes the matrix rock (like shale), cement, and casing pipe together firmly enough that slipping between the interfaces cannot occur. Therefore, the casing pipe will be strain matched to the surrounding rock matrix. Specifically, the strain measured inside of the pipe will be the same as the strain induced in the surrounding rock.

Figure 5:
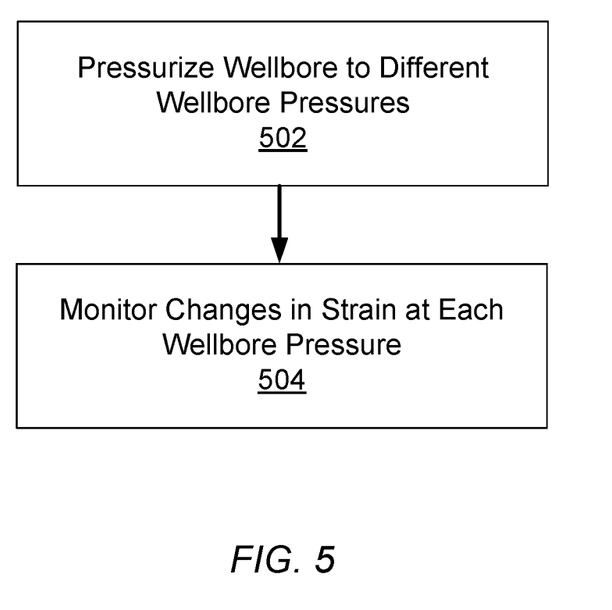
FIG. 5 depicts a flow chart of a method for making measurements in a wellbore.

The strain measurements can be made at multiple locations in the well and the assembly of strain sensors can be moved to different locations in the well as the fractures are created in the adjacent well. This allows the measurements to be made across a long length of wellbore with a limited number of strain sensors. The measurements made in the monitoring well can then be interpreted using a geomechanical model to infer the fracture length, width and orientation of a propagating fracture in a neighboring well. As shown in FIG. 5 the measurements can also be made by pressurizing the wellbore to different wellbore pressures in 502 and monitoring the changes in the strain at each wellbore pressure in 504. These changes in strain in different orientations provide a measure of the magnitude and orientation of the in-situ stress field. For example, when strain measurements are made at a plurality of locations at substantially the same time during hydraulic fracturing, this allows the azimuthal orientations of the fractured portion of the formation to be determined.

Figure 1:
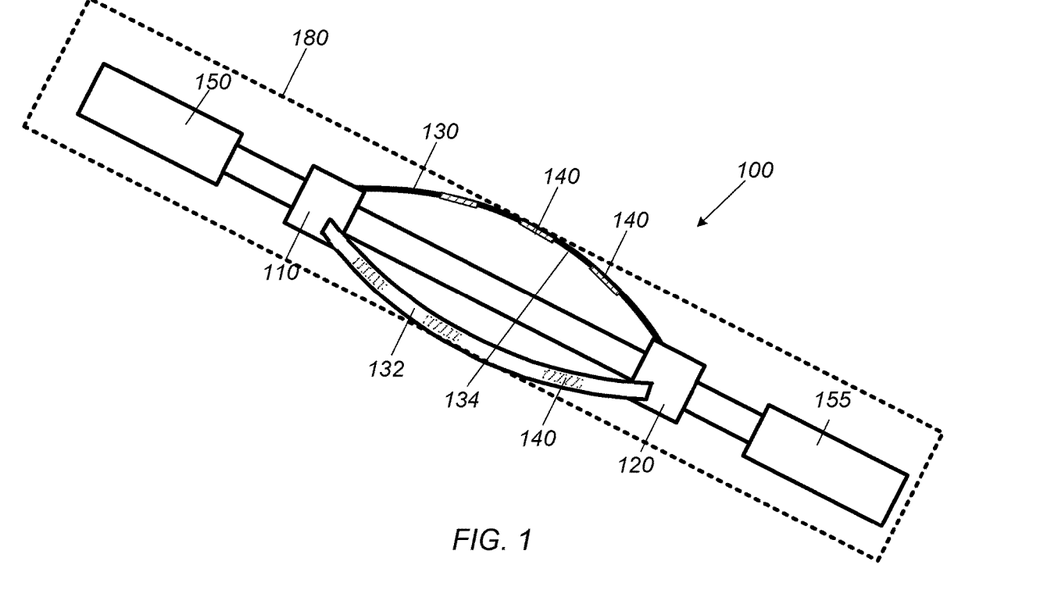
FIG. 1 depicts a sensing device for use in a cased wellbore.

An embodiment of a strain sensing device based on a bow spring centralizer is shown in FIG. 1. Strain sensing device 100 includes a body having a top portion 110 and a bottom portion 120. One or more elastically deformable members 130 are coupled between top portion 110 and bottom portion 120. In some embodiments, top portion 110 and bottom portion 120 may be substantially ring shaped and the elastically deformable members 130 may be bow shaped. One or more elastically deformable members 130 are formed from an elastic material that can withstand various production fluids and temperatures expected within the casing 180. In one embodiment, the elastically deformable members are made of a carbon fiber material. Each of the one or more elastically deformable members has an outer contact surface 132 and an inner non-contact surface 134. In some embodiments, a plurality of elastically deformable members 130 may be dispersed radially around the body of the device.

One or more sensors 140 are disposed on, or embedded within, one or more of the elastically deformable members. The sensors 140, during use, provide data that can be used to determine changes to strain on the exterior of a pipe (e.g., a casing in a wellbore). Sensors may be strain sensors that can detect changes in strain on the elastically deformable members to which the sensor is attached. Alternatively, sensors 140 may be position sensors that determine an absolute or relative position of sensing device 100, as has been described above. In some embodiments, a sensing device includes both strain sensors and position sensors. Sensors 140 may be disposed on, or embedded within, each of the one or more elastically deformable members.

Each of the one or more elastically deformable members has an outer contact surface 132 and an inner non-contact surface 134. In one embodiment, one or more sensors 140 are disposed on the inner non-contact surface of one or more of the elastically deformable members.

In order to measure the strain of casing 180, sensing device 100 needs to be positioned within the casing 180 at the desired location. This may be accomplished using a positioning device, such as a coiled tubing unit or a wireline. Sensing device 100 may include connectors 150 and 155 that allow the sensing device to be coupled to a positioning device. Connectors 150 or 155 may also be used to connect devices to each other through an elongated rod. For example, connector 150 may be coupled to a positioning device and connector 155 coupled to an elongated rod. The elongated rod can then be coupled to an additional sensing device, to create a string of devices. Sensing device 100 may include an opening extending from connector 150 to connector 155 which allows a conduit to be passed through the sensing device. In this embodiment, the sensing device serves the dual function of monitoring the stress from the surrounding formation and acting as a centralizer for various production tools.

During use sensing device 100 may be stopped at a certain location and a measurement may be made. After the measurement is made, the device can be moved to another location and another measurement can be made later. In some embodiments, an array of devices may be formed by coupling a plurality of devices together. The array of devices is positioned in the casing 180 of a wellbore, and all of the devices can be making measurements while the array is stationary in the casing 180. The array may also be moved within the casing 180 to make measurements at different locations in the casing 180.

In some embodiments, the sensing device may be equipped with one or more accelerometers, one or more gyroscopes, or one or more magnetic compasses that will allow the tool orientation (north, south, east or west and up and down with respect to the earths gravitational field) to be determined in vertical, horizontal or deviated wellbores. The accelerometer is used to determine that the overall tool is stationary while the bow springs deform. If the overall environment or the tool itself is moving then the strain measurements don't necessarily map to the bore or casing wall position any more. Also resolving the axis of gravity will allow us to know which way the springs are oriented in the bore.

In some embodiments the sensing device may be equipped with a memory module that will record and store all the information downhole and/or a data transmission module to transmit the data up-hole for processing.

Figure 2:
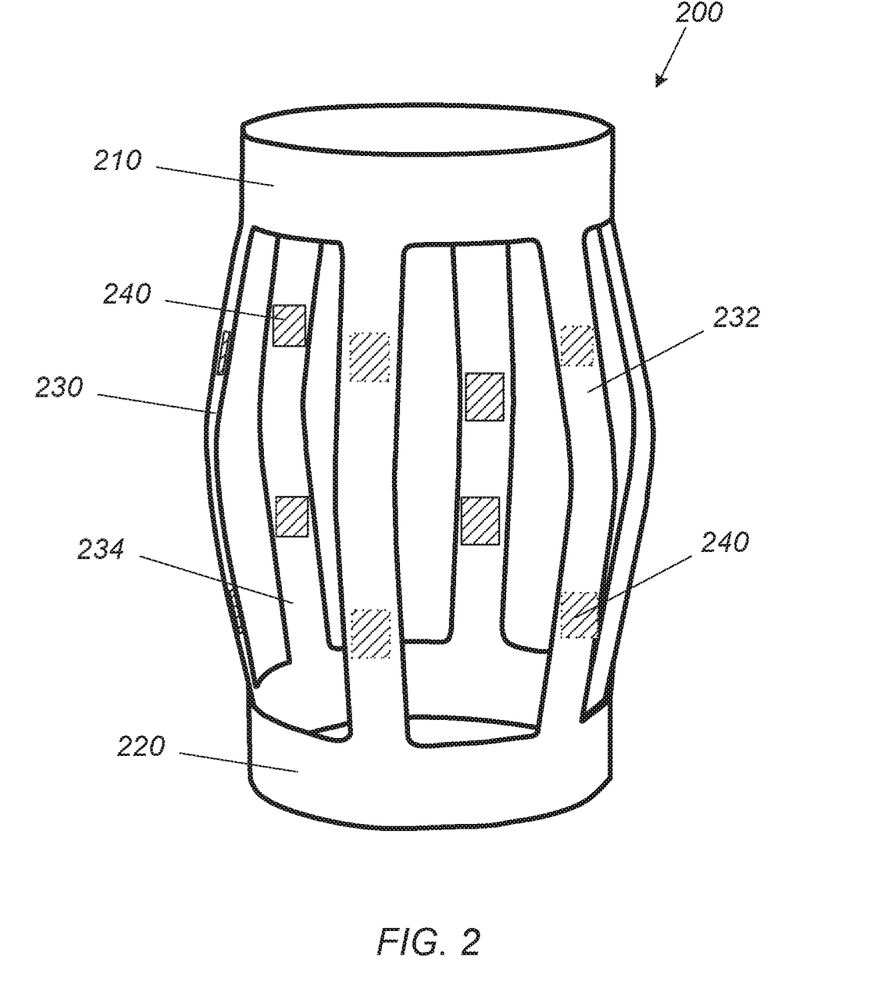
FIG. 2 depicts a sensing device for use in an open hole wellbore.

While the above example is generally described for use in a cased hole, it should be understood that the sensing devices described herein can also be used for an open hole. A sensing device that may be more suitable for an open hole is depicted in FIG. 2. Sensing device 200 includes a body having a top portion 210 and a bottom portion 220. One or more elastically deformable members 230 are coupled between top portion 210 and the bottom portion 220. In some embodiments, top portion 210 and bottom portion 220 may be substantially ring shaped and the elastically deformable members 230 may be bow shaped. One or more elastically deformable members 230 are formed from an elastic material that can withstand various production fluids and temperatures expected within the casing. In one embodiment, the elastically deformable members are made of a carbon fiber material. Each of the one or more elastically deformable members has an outer contact surface 232 and an inner non-contact surface 234. In one embodiment, one or more sensors 240 are disposed on the inner non-contact surface of one or more of the elastically deformable members.

The sensors 240, during use, provide data that can be used to determine changes to strain on the exterior of a pipe (e.g., a casing in a wellbore). Sensors 240 may be strain sensors or distance sensors, as has been described above. In some embodiments, a sensing device includes a both strain sensor and position sensors.

In order to measure the strain of a casing, sensing device 100 needs to be positioned within the open hole at the desired location. This may be accomplished using a positioning device, such as a coiled tubing unit or a wireline. Alternatively, the sensing device may be coupled to a casing tube, with the casing running through the hollow longitudinal axis of sensing device 200. Top portion 210 and bottom portion 220 may be used to permanently, or temporarily couple sensing device 200 to a section of tubing.

During use sensing device 200 may be stopped at a certain location and a measurement of the strain in a formation may be directly made. In some embodiments, an array of devices is placed on the exterior of a casing for a wellbore at certain spacing and all of the devices can be making measurements while the array is stationary after the casing is inserted into the wellbore. The array may also be moved using the casing to make measurements at different locations in the casing.

Most of the prior art strain sensing methods monitor the longitudinal strain along some length of bore. In contrast to previous methods, our sensing devices monitor transverse strain in multiple locations by resolving the elliptical cross section changes in the borehole or casing. Most centralizers have bow springs that are in direct contact with that borehole or the casing. Any strain in to the borehole or the casing will deform the bore and change the strain on the bow springs. One method to differentiate between independent bow spring strains and actual rock matrix borehole/casing strains is by monitoring the elliptical cross section change.

In an exemplary embodiment, a centralizer has four bow springs at 90° intervals. For the understanding of this example, it is assumed the bow springs are on the vertical and horizontal planes. When the borehall/casing changes shape due to an external stress field, from side loading for instance, then the two horizontal springs will deform inward and the two vertical springs will deform outward. By analyzing the strain gauge data for these push-pull events the elliptical strain events can be isolated from the normal strains affecting the centralizer bow springs. Adding more instrumented bow springs around the center will help resolve non-ideal alignment. In some embodiments, adding an accelerometer and or a magnetic compass will provide orientation data that can map the stress field around the sensor location. Multiple sensors along the length of the bore give the ability to map time-of-arrival of stress/strain fields along the bore.

The proposed devices and methods have some clear advantages over the current devices and methods:
1. The methods utilize modifications of existing tools (centralizer or caliper and a packer) that are routinely run in wells.
2. The tools used to implement the proposed method are relatively inexpensive to build and run and so may be more widely used.
3. The method provides good azimuthal resolution (unlike DFITs or fiber optics). This allows us to measure the stress field (stress in different directions) and changes in the stress field and from that infer the orientation and magnitude of the minimum and maximum stress.
4. Changes to the stress field over time can be measured. One important application of this is to monitor the propagation of a fracture in a nearby well. Changes in the stress field induced by the propagation of a fracture in the vicinity of the monitoring well allow the geometry of the propagating fracture to be estimated.
5. Multiple tools can be run in a single tool string to measure the stress field at different locations in the wellbore.
6. The method is non-intrusive. The devices can be run from inside a borehole, in both cased wellbores and in open-hole completions.
7. The method does not require the formation to be fractured while being tested.
8. The method can be run in wells of any depth.
9. The method can be run in both open-hole and cased hole wells (unlike fiber optic installations).
10. Analysis and inversion of the data can be done using existing models and simulation tools.

Figure 3:
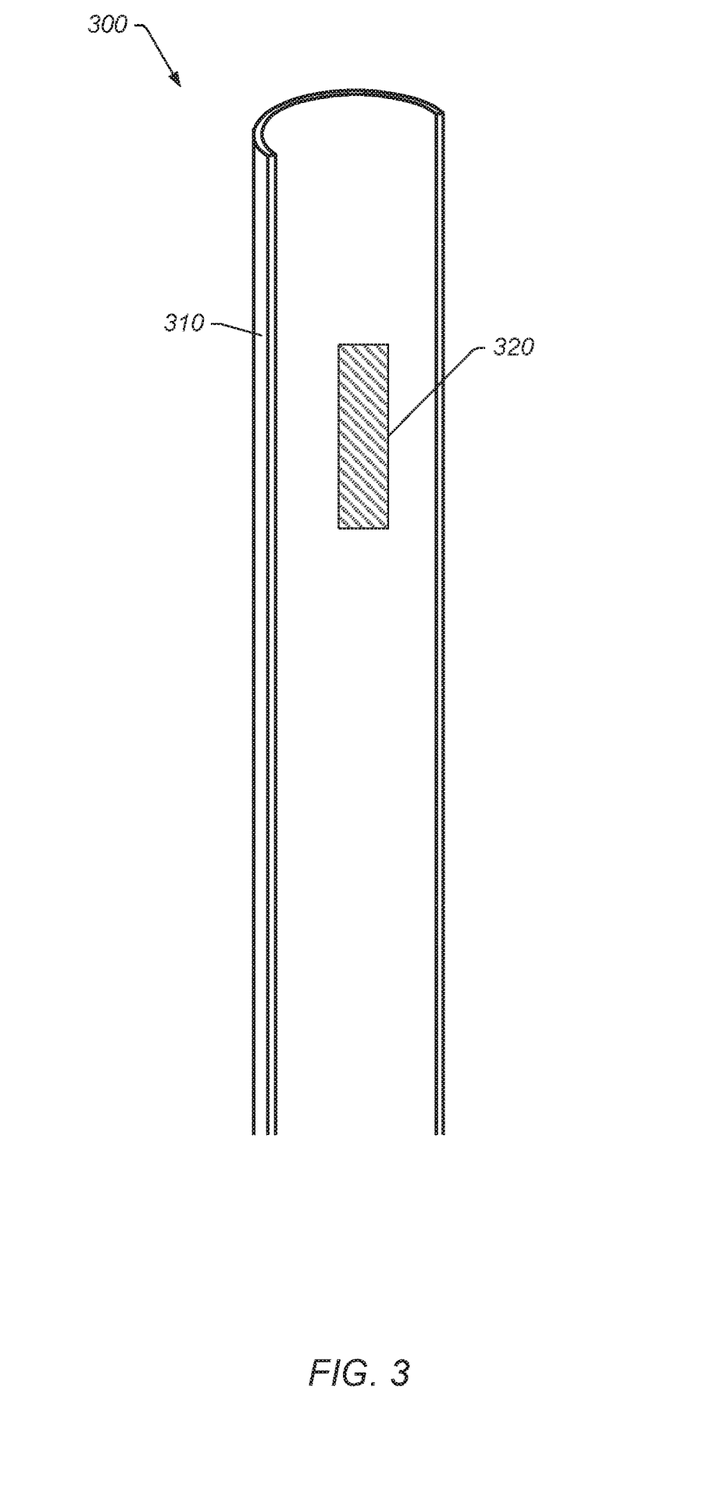
FIG. 3 depicts a casing for a wellbore with a sensing device attached to the interior surface of the casing device.

In another embodiment, one or more strain sensors may be attached directly to the casing, as shown in FIG. 3. In FIG. 3, a casing 300, includes a substantially cylindrical body 310 having one or more sensors 320 attached to the interior surface of the casing. The sensors 320, during use, provide data that can be used to determine changes to strain on the exterior of the casing in a wellbore. Sensors may be strain sensors that can detect changes in strain on the elastically deformable members to which the sensor is attached.

Figure 4:
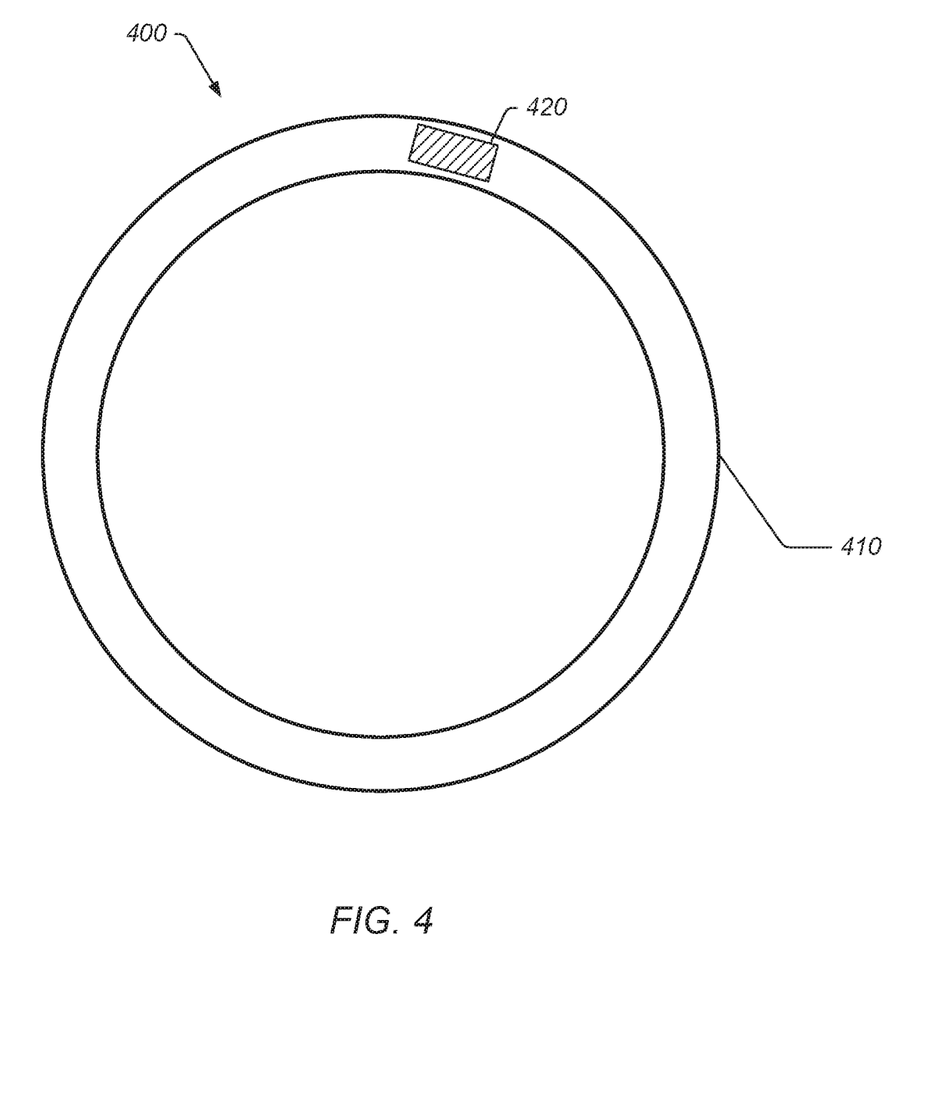
FIG. 4 depicts a cross-sectional view of a casing for a wellbore having a sensing device embedded in the casing.

In another embodiment, one or more strain sensors may be embedded in the casing, as shown in FIG. 4. In FIG. 4, a casing 400, includes a substantially cylindrical body 410 having one or more sensors 420 embedded in the body 410. The sensors 420, during use, provide data that can be used to determine changes to strain on the exterior of the casing in a wellbore. Sensors may be strain sensors that can detect changes in strain on the elastically deformable members to which the sensor is attached.

The downhole strain measurement devices described herein may be used to determine the minimum and maximum stress and/or the geometry of a fracture. In an embodiment, downhole strain measurements may be used to infer the magnitude and orientation of the in-situ stresses in a fracture formation including the minimum and maximum horizontal stresses at specific depths in a wellbore.

In an embodiment, a method of determining the minimum and maximum stress and/or the geometry of a fracture includes pressurizing or depressurizing the wellbore with any fluid and measuring the strain induced in the casing 180 (or in an open wellbore) in response to this change in wellbore pressure. A higher strain will be induced in the casing 180 (or wellbore) in the direction of the minimum horizontal stress. The strains induced by this increase in wellbore pressure in different directions can be used to not only infer the direction of this in-situ stresses but also their magnitude. Analytical or numerical models may be used to convert change in the measured elliptical shape of the borehole to the magnitude of the principal in-situ stresses.

This direction dependent strain induced by a change in wellbore pressure can be measured at different depths by isolating and pressurizing (or depressurizing) different sections of the wellbore.

In a cased wellbore any deviation in the shape of the wellbore from a circular cross section provides an indication of the direction of the minimum and maximum horizontal stress. The minimum horizontal stress will be oriented in the direction of the maximum well diameter. A similar result is obtained for open-hole completions.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device for measuring strain on the exterior of a pipe comprising:
    a body having a top portion and a bottom portion, wherein the top portion and the bottom portion are ring shaped;
    one or more elastically deformable members coupled between the top portion and the bottom portion, and wherein the elastically deformable members are bow-shaped; and
    one or more strain sensors disposed on, or embedded within, one or more of the elastically deformable members;
    wherein the device is configured to be placed in the pipe in a wellbore such that the elastically deformable members contact an interior surface of the pipe; and
    wherein the sensors, during use, provide data that can be used to determine strain or changes in strain in the wellbore.

2. The device of claim 1, wherein one or more of the sensors are strain sensors that determine strain or changes in strain on one or more of the elastically deformable members.

3. The device of claim 1, wherein one or more of the sensors are position or orientation sensors that are used to determine a change in position or orientation of the device within the pipe.

4. The device of claim 1, wherein sensors are disposed on, or embedded within, each of the one or more of the elastically deformable members.

5. The device of claim 1, wherein the elastically deformable members are dispersed radially around the body.

6. The device of claim 1, further comprising one or more accelerometers.

7. The device of claim 1, further comprising one or more gyroscopes.

8. The device of claim 1, further comprising one or more memory modules.

9. The device of claim 1, wherein the top portion the bottom portion is configured to be coupled to coiled tubing or a wireline.

10. A system for measuring strain on the exterior of a pipe comprising two or more devices as claimed in claim 1 coupled to each other.

11. A device for measuring strain on the exterior of a pipe comprising:
    a body having a top portion and a bottom portion, wherein the top portion and the bottom portion are ring shaped;
    one or more elastically deformable members coupled between the top portion and the bottom portion, and wherein the elastically deformable members are bow-shaped; and
    one or more strain sensors disposed on, or embedded within, one or more of the elastically deformable members;
    wherein the device is configured to be moved to different positions in a wellbore; and
    wherein the sensors, during use, provide data that can be used to determine strain or changes in strain in the wellbore.

12. A method of measuring strain in a pipe positioned in a wellbore, comprising:
    positioning a device inside the pipe such that the device contacts the interior surface of the pipe, wherein the device includes:
        one or more elastically deformable members; and
        one or more strain sensors disposed on, or embedded within, one or more of the elastically deformable members;
    moving the device to different positions in the wellbore; and
    determining changes in strain at two or more of the different positions in the wellbore, wherein strain on an exterior of the pipe is determined based on data from the strain sensors.

13. The method of claim 12, further comprising removing the device from the wellbore after measurements of strain are completed.

14. The method of claim 12, wherein the strain on the exterior of the pipe is measured while a formation surrounding the wellbore is hydraulically fractured.

15. The method of claim 14, wherein measurements of the strain are made at a plurality of locations at substantially the same time during hydraulic fracturing to allow the azimuthal orientations of the fractured portion of the formation to be determined.

16. The method of claim 12, further comprising changing the pressure in the wellbore and measuring the strain on the exterior of the pipe during the change in pressure.

\* \* \* \* \*

UNITED STATES PATENT AND TRADEMARK OFFICE
CERTIFICATE OF CORRECTION

PATENT NO. : 11,512,589 B2
APPLICATION NO. : 17/059529
DATED : November 29, 2022
INVENTOR(S) : Rodney Thompson Russell et al.

It is certified that error appears in the above-identified patent and that said Letters Patent is hereby corrected as shown below:

In the Claims

Claim 9, Column 10, Line 19, please add -- or -- after "top portion" and before "the bottom".

Signed and Sealed this
Twenty-first Day of February, 2023

Katherine Kelly Vidal
*Director of the United States Patent and Trademark Office*